United States Patent [19]

Hessler

[11] Patent Number: 4,646,438
[45] Date of Patent: Mar. 3, 1987

[54] ROTARY SHEAR ATTACHMENT AND TOOL FOR LAMINATED PLASTIC AND OTHER MATERIALS

[76] Inventor: Donald B. Hessler, 4115 Adams St., Denver, Colo. 80216

[21] Appl. No.: 858,060

[22] Filed: May 1, 1986

Related U.S. Application Data

[63] Continuation of Ser. No. 577,539, Feb. 6, 1984, abandoned.

[51] Int. Cl.[4] .............................................. B26B 13/00
[52] U.S. Cl. ........................................ 30/263; 30/115; 30/265; 83/471
[58] Field of Search ................. 30/115, 263, 264, 265, 30/278, 279 R, 296; 83/471, 471.1, 471.2, 471.3

[56] References Cited
U.S. PATENT DOCUMENTS

| | | | |
|---|---|---|---|
| 2,522,006 | 9/1950 | Willcox | 30/263 X |
| 2,570,195 | 10/1951 | Bird et al. | 30/264 |
| 2,861,340 | 11/1958 | Hazzard | 30/264 X |
| 3,454,055 | 7/1969 | Schoettlen | 83/471 X |

Primary Examiner—E. R. Kazenske
Assistant Examiner—Willmon Fridie, Jr.
Attorney, Agent, or Firm—Norvell E. Von Behren; Donna J. Thies

[57] ABSTRACT

A rotary shear attachment and tool for laminated plastic and other materials is disclosed. The shear attachment comprises a frame which is fixed to an existing motor case and has an upper and a lower portion spaced apart and separated by a central portion. Driving and cutting wheels are positioned on the frame and are rotatably mounted for cutting the plastic and other materials. A chip breaker is positioned on the frame to break up the chip formed by the shear attachment and the frame has means associated with it for diverting one side of the plastic being cut in a direction away from the plane of the other side of the plastic. The novel rotary shear attachment may be incorporated into an improved rotary tool, may be incorporated into existing rotary tools and may also be used with a novel table for cutting a large sheet of plastic at a job site.

14 Claims, 21 Drawing Figures

ROTARY SHEAR ATTACHMENT AND TOOL FOR LAMINATED PLASTIC AND OTHER MATERIALS

This is a continuation of Ser. No. 06/577,539 filed Feb. 6, 1984 now abandoned.

BACKGROUND OF THE INVENTION

This invention relates generally to power tools and more specifically to a new and improved rotary shear attachment for use on a power tool which is capable of cutting laminated plastic and other materials.

In cutting laminated plastic and other similar materials, it is necessary to obtain a clean, sharp cut on the edge of the materials since these are often used for counter tops in kitchens and other places where appearance is a prime consideration. When the cut on the laminate is not clean and sharp, the edge appearance will be diminished which can result in complaints from the purchaser of the installation.

Many rotary shearing tools are available for cutting large sheets of laminated materials and also large sheets of metal to make proper cuts. Since laminated plastics and other similar materials must be properly cut or else the edges will shatter, it is highly important to have a proper power tool to obtain such cuts.

It is known in the art to provide rotary shears consisting of various combinations of cutting wheels as typified in the U.S. Pat. No. 3,906,629, issued Sept. 23, 1975 to Francis Joseph Fuchs, Jr. and in the U.S. Pat. No. 2,570,195, issued Oct. 9, 1951 to W. N. Bird et al. These devices are generally suitable for use on a variety of sheet materials other than laminated plastic which the applicants invention is designed to cut.

Other cutting and shaping tools for sheet material are taught in the U.S. Pat. No. 3,364,710, issued Jan. 23, 1968 to G. Rouyer et al and in the U.S. Pat. No. 2,276,365, issued Mar. 17, 1942 to J. Angel. Other designs of adjustable rotary shears are shown in the U.S. Pat. No. 2,728,985, issued Jan. 3, 1956 to R. C. Quackenbush and in the U.S. Pat. No. 3,710,444 issued Jan. 16, 1973. The before mentioned devices while suitable for their specific purposes are not suitable for use when cutting laminated plastic and other similar material.

Various cutting jigs and tables are taught in the U.S. Pat. No. 2,539,401, issued Jan. 30, 1951 to Jack W. Carl et al and in the U.S. Pat. No. 3,496,812, issued Feb. 24, 1970 to Kenneth N. White et al. Further sheet metal cutting devices are taught in the U.S. Pat. No. 2,216,629, issued. Oct. 1, 1940 to Edward R. Sabel et al and in the U.S. Pat. No. 3,126,780, issued Mar. 31, 1964 to Benjamin Edward Booth. A further shear assembly device is shown in the U.S. Pat. No. 2,659,436, issued Nov. 17, 1963 to L. V. Dutro et al. A portable sheet metal cutter is also taught in the U.S. Pat. No. 2,042,097, issued May 26, 1936 to A. R. Havanas.

A commercialized rotary power cutter manufactured by Black and Decker, Inc. and labeled as Model 7975 utilizes a single driving wheel and cutting wheel which is suitable for various materials such as steel, aluminum, fiberglass, corrugated box board and other materials but is not recommended for use with laminated plastic material such as manufactured under the registered trademark FORMICA.

All of the before mentioned rotary tools, fixtures and other devices are not capable of successfully cutting plastic laminate with clean, sharp cuts which do not leave shattered edges as is capable of being accomplished with the applicants new and novel device.

SUMMARY OF THE INVENTION

In order to overcome the problems inherent in the prior art devices hereinbefore described, there has been provided by the applicants invention a new and novel rotary shear attachment which may be used with existing power drives on the market today and may also be used in combination with a motor and case to provide the new and novel cutting invention hereinafter described. The applicants device may also be used with a novel table which allows the device to have greater flexibility while providing good, clean cuts on plastic laminates of the type generally used for counter tops and other uses.

The applicants device in its basic form comprises a unique frame used with at least one cutter wheel and one idler wheel with a novel chip breaker being utilized with the wheels. The frame contains diverting means for diverting one side of the material being cut to a different plane than the other side thereby aiding in the cut obtained. The chip breaker functions in combination with the wheels to allow the chips to build up between one of the wheels and the chip breaker thereby serving to drive the idler wheel thereby aiding in driving the plastic laminate or other material through the rotary shear.

In the preferred embodiment shown a pair of driving wheels are attached to the motive power with the chip breaker being positioned between the wheels and with an idling cutter wheel being mounted for positioning between the spaced apart driving wheels on the frame of the device.

A new and unusual table having various improved features may be used in combination with the applicants rotary tool having the rotary shear attachment contained on the tool to make the overall device more adaptable for use at a site location by an installer of counter tops or the like. The table attachment contains attaching means for quickly and fixedly attaching the rotary tool to the table so that the proper cuts can be made with the rotary shear attachment.

Accordingly an object and advantage of the invention is to provide a new and novel rotary shear attachment for an existing commercialized power tool which will allow plastic laminate to be precisely cut without shattering the edges of the cut where the tool operates.

Still yet another object and advantage of the invention is to provide a new and novel rotary shear attachment which contains novel means for providing a chip which functions to aid in driving the plastic laminate sheet through the shear attachment with the attachment also containing a chip breaker which serves to clean out accumulated chip from between adjacent spaced apart wheels of the device.

Yet another object and advantage of the invention is to provide a new and novel rotary shear attachment which contains a novel chip breaker which allows the device to be operated forward and reverse without causing problems in the cutting of the plastic laminate.

Still yet another object and advantage of the invention is to provide a new and novel rotary tool having the applicants rotary shear attachment formed on the tool with the tool capable of being attached to a novel table making on-site accurate cutting of the plastic laminate more feasible.

BRIEF DESCRIPTION OF THE DRAWINGS

FIG. 4 is a view similar to FIG. 3 showing the frame of the applicants novel rotary shear attachment fastened to an existing gear case of an existing rotary tool of the type on the market place today. FIG. 4 is also a view taken along line 4—4 of FIG. 5 showing the basic parts of the applicants novel rotary shear attachment.

DESCRIPTION OF THE PREFERRED EMBODIMENT

Figure 1:
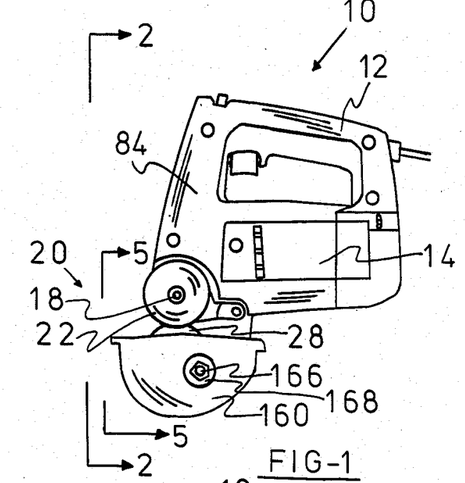
FIG. 1 is a side view of the applicants novel rotary tool shown with his novel rotary shear attachment contained on the lower portion of the tool.
Figures 2, 8, 9:
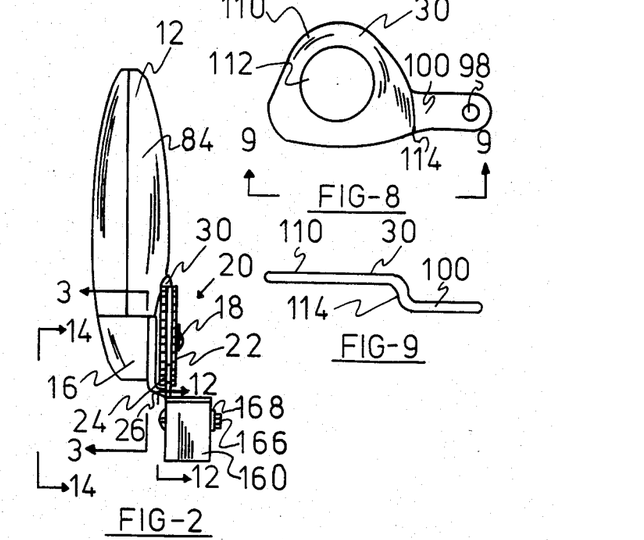
FIG. 2 is an end view, taken along line 2—2 of FIG. 1 showing in greater detail the construction of the novel rotary shear attachment.
FIG. 8 is a side view of the chip breaker used with the applicants rotary shear attachment.
FIG. 9 is a bottom view, taken along line 9—9 of FIG. 8 showing in further detail the construction of the chip breaker.

Referring now to the drawings in general and in particular to FIGS. 1 and 2 of the drawings there is shown the applicants novel rotary tool generally by the numeral 10 which comprises a handle case 12 having a motor 14 positioned in the handle case as shown in FIG. 1. An internal gearing 16 is contained in the lower portion of the rotary tool and contains the necessary gears which are driven from the motor 14 to drive the attachment fastened to the lower portion of the rotary tool.

In the embodiment shown, the applicant has taken an existing commercialized rotary power cutter manufactured by Black and Decker, Inc. and sold to industry as Model No. 7975 and has improved that rotary power cutter in a new and novel way so that it is fuctional to cut laminated plastic and other material with clean, sharp cuts which do not shatter or destroy the edges of the cut as is necessary for counter tops and other uses.

The applicants novel rotary shear attachment 20 is adapted to be mounted on existing gear case 16 as will be described more fully hereinafter and contains, in the preferred embodiment, a pair of driving wheels 22 and 24 which are positioned on a frame 26 as shown in FIG. 2 of the drawing and also in FIG. 5 of the drawing.

A lower idling cutter wheel 28 is also carried by the frame 26 and a novel chip breaker 30 is positioned between the driving wheels 22 and 24 and functions in a novel manner which will be described more fully hereinafter. The frame 26 contains diverting means, shown generally by the numeral 32 for diverting one side of the plastic or other material being cut in a direction away from the plane of the other side of the plastic material as the material passes through the rotary shear attachment. The diverting means 32 is shown more clearly in FIG. 5 of the drawing.

Figure 5:
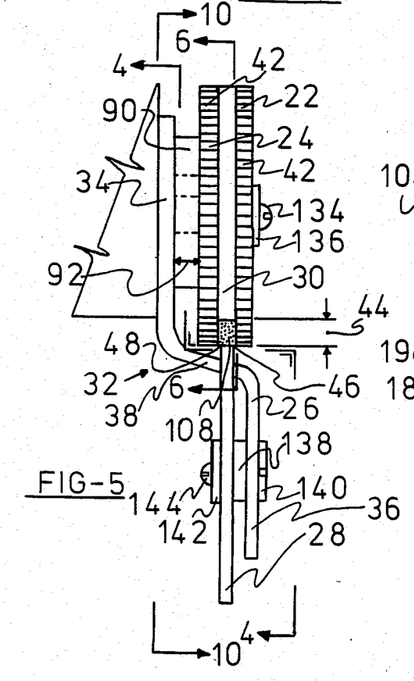
FIG. 5 is a partial end view, taken along line 5—5 of FIG. 1 showing in enlarged detail the basic parts of the applicants novel rotary shear attachment.

The frame 26 of the applicants rotary shear attachment is formed with an upper portion 34 shown more clearly in FIG. 5 of the drawing and a lower portion 36 spaced apart from the upper portion by a central portion 38. The diverting means 32 before mentioned comprises in part a separate frame 40 which is welded to or fixed to the upper portion 34 of the frame on one end and to the central portion 38 of the frame on the other end thereof. The central portion 38 in combination with the separate frame 40 serves as the diverting means before mentioned.

In the preferred embodiment there are a pair of driving wheels 22 and 24 as shown in FIG. 5 of the drawing with each driving wheel having serrations 42 formed around the circumference of the wheels serving as teeth or biting surfaces to aid in driving the plastic laminated sheet through the rotary shear attachment in combination with the novel chip breaker 30 as will be described more fully hereinafter. The preferred embodiment shown in FIG. 5 also contains one lower idling cutter wheel 28 carried by the lower portion 38 of the frame 26 and positioned between the upper driving wheels 22 and 24. The circumferential edge of the lower idling cutter wheel 28 may be positioned flush with the circumferential edges of the upper driving wheels 22 and 24. The lower idling cutter wheel 28 may also be positioned inside the upper driving wheels 22 and 24 up to the extent of the chip break 30 as shown by the numeral dimension 44 in FIG. 5 of the drawing. In the preferred embodiment the dimension 44 would be approximately one quarter of an inch and the lower idling cutter wheel 28 can extend up to the chip breaker 30 within approximately one-sixteenth of an inch. When the rotary shear attachment is formed as shown in FIG. 5, there is contained two cutting points 46 and 48 which are formed by the positioned wheels and serve to cut or shear the plastic laminate as it passes through the rotary shear attachment between the upper driving wheels 22 and 24 and the lower idling cutter wheel 28.

Figures 3, 7, 10, 11, 12, 13, 14, 15:
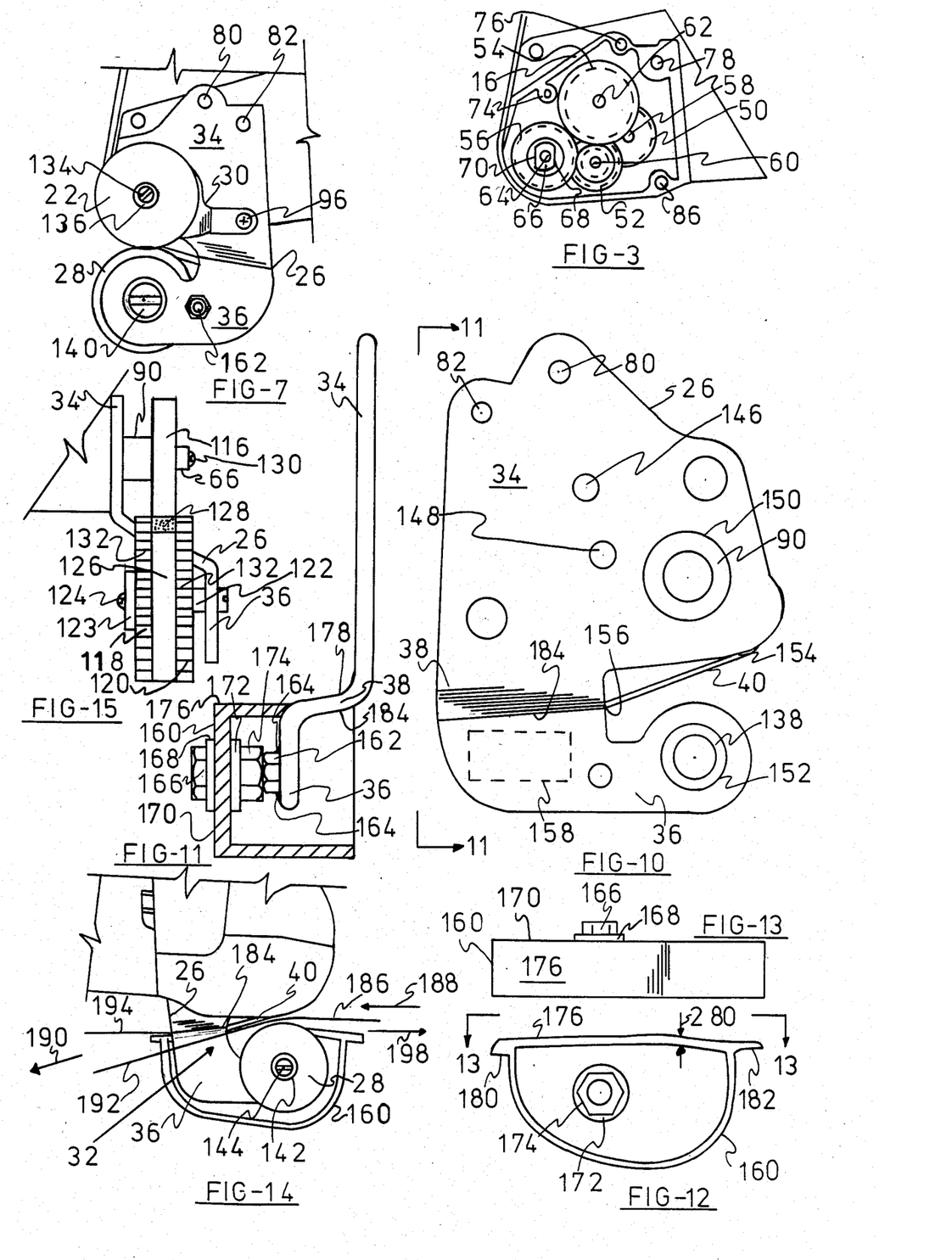
FIG. 3 is a side view, taken along line 3—3 of FIG. 2 showing in detail the gear case of an existing power tool which may be adapted to contain the applicants novel rotary shear attachment.
FIG. 7 is a view similar to the view shown in FIG. 4 and shown the frame of the applicants novel rotary shear attachment fastened to the existing gear case shown in FIG. 3 and also showing the driving wheels and the idling cutter wheel of the applicants invention positioned in place with the chip breaker also shown positioned in its proper place.
FIG. 10 is a side view, taken along line 10—10 of FIG. 5 showing in greater detail an enlarged view of the frame of the rotary shear attachment and also showing in detail the diverting means of the applicants invention.
FIG. 11 is an end view, taken along line 11—11 of FIG. 1 showing in further detail the construction of the frame of the rotary shear attachment and also showing in detail the idling cutting wheel guard and how it is positioned on and attached to the frame. The guard is shown in section for clarity.
FIG. 12 is a side view, taken along line 12—12 of FIG. 2 showing in greater detail the idling cutter wheel guard.
FIG. 13 is a top view, taken along line 13—13 of FIG. 12 showing in further detail the construction of the idling cutter wheel guard.
FIG. 14 is a partial side view, taken along line 14—14 of FIG. 2 showing in detail a laminated plastic sheet passing through the rotary shear attachment and showing in greater detail how the diverting means of the applicants invention serves to divert one side of the plastic being cut in a direction away from the plane of the other side of the plastic as the material passes through the rotary shear.
FIG. 15 is a view similar to the view shown in FIG. 5 showing a modification of the applicants basic invention utilizing one driving wheel and a pair of idling wheels with the idling wheels being carried by the lower portion of the frame of the applicants invention.
Figure 4:
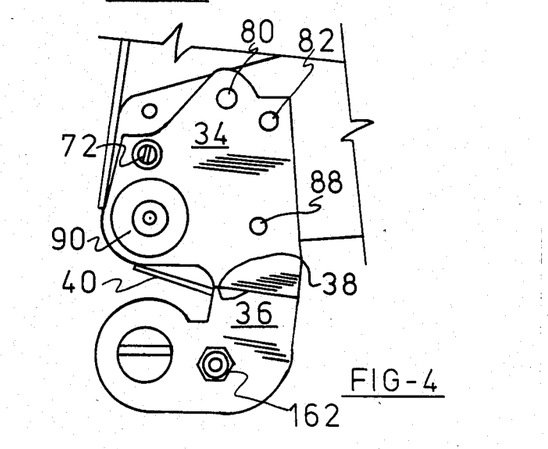

Referring now to FIGS. 3 and 4 of the drawing there will be described in greater detail how the applicants frame 26 may be mounted to the existing gearing case 16 of an existing power tool to improve that power tool so that it will be able to cut laminated plastic as hereinbefore described. FIG. 3 shows a side view, taken along line 3—3 of FIG. 2 and shows a plurality of gears 50, 52, 54 and 56 carried by the shafts 58, 60, 62 and 64. The gears 50, 52, 54 and 56 are positioned within the gear case 16 and are designed to provide a driving means for driving the attachment to the power tool. The driving means would be the shaft 66 contained around the shaft 64 and having a pair of flat surfaces 68 and 70 designed to engage an attached rotary shear attachment.

Referring to FIG. 4 there is shown how the applicants frame 26 would be positioned over the gear case 16 with its upper portion 34 positioned as shown in FIG. 4 and attached to the gear case 16 by means of a screw 72 positioned within the drilled and tapped hole 74. The drilled and tapped holes 76 and 78 of the gear case 16 as shown in FIG. 3 will also contain screws which will be positioned through the holes 80 and 82 formed in the upper portion 34 of the frame 26. The screws positioned in the holes 80 and 82 will be also positioned through holes, not shown in the drawing, in the split case 84 of the rotary tool. A drilled and tapped hole 86 in the gear case 16 will also be utilized in combination with a drilled hole 88 in the upper portion 34 of the frame 26 to rigidly fasten the chip break 30 to the frame 26 as will be described more fully hereinafter.

In FIG. 4, there can be seen a bushing 90 which is positioned over the shaft 66 and serves as a spacer to space the upper driving wheel 24 from the upper portion 34 of the frame 26. This spacing is shown by the numeral 92 in FIG. 5 of the drawing and serves to set the remaining wheels in place on the rotary shear attachment.

Figure 6:
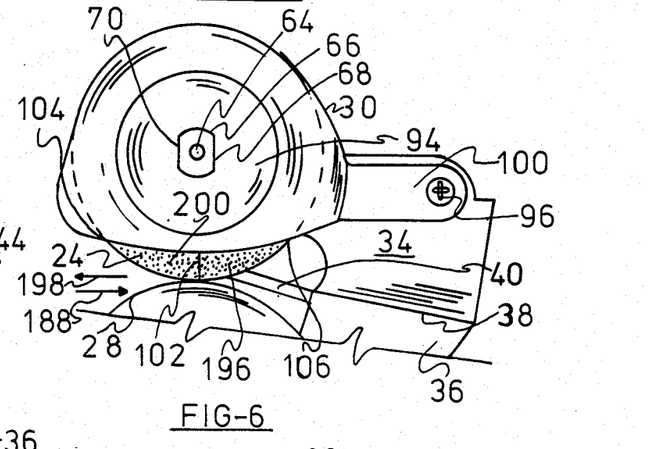
FIG. 6 is a partial side view, taken along line 6—6 of FIG. 5 showing in detail the chip breaker utilized with the applicants novel rotary shear attachment.

Referring now to FIG. 6 of the drawing and to FIG. 5, there can be seen how the chip breaker 30 is positioned on the washer 94 which also is positioned over the shaft 66. The chip breaker 30 is then rigidly fastened to the upper portion 34 of the frame 26 by means of the drilled and tapped hole 86 shown in FIG. 3 of the drawing. A screw 96 is positioned through a hole 98 formed in the arm 100 of the chip breaker.

Since the driving wheels 22 and 24 are keyed to the shaft 66 by means of the flat surfaces 68 and 70 it can be seen how the washer 94 along with the driving wheel 24 will rotate while the chip breaker 30 remains stationary since it has been fixed to the upper portion 34 of the frame 26 by means of the screw 96. The lower portion 102 of the wheels 24 and 22 will be the area where a chip will build up within the applicants device and will be broken and discarded as the wheels 22 and 24 rotate. The chip will be discarded from the device at the points 104 and 106 depending on whether the rotary tool is running forward or to the rear. Due to the unique construction and positioning of the chip breaker 30 between the driving wheels 22 and 24, chip build-up between the wheels is eliminated except in the area 102 shown in FIG. 6. As the chip is formed due to the cutting action of the lower idling cutting wheel 28 and two upper driving wheels 22 and 24 within the area 108 as shown in FIG. 5, the chip build-up will serve to drive the lower idling cutter wheel 28 thereby aiding in driving the plastic laminate sheet through the applicants novel shear attachment. While the serrations 42 on the driving wheels 22 and 24 will serve to aid in driving the plastic sheet through the applicants device, it is believed that the chip build-up in the area 102 as shown in FIG. 6 and in the area 108 shown in FIG. 5 causes a major driving force by rotating the lower idling cutter wheel 28. It is felt that this chip build-up and driving of the lower cutter wheel 28 contributes to the major driving force of driving the plastic laminate sheet through the applicants device. In FIGS. 5 and 6 of the drawing, the chip build-up is shown by the speckled areas shown by the numerals 102 in FIG. 6 and 108 in FIG. 5. Due to the novel configuration of the chip breaker 30 the build-up in these areas is minimized and controlled to the degree that it is felt necessary for the functioning of the chip to aid in rotating the idling lower cutter wheel 28.

Referring to FIGS. 8 and 9 there is shown in greater detail the construction of the chip breaker 30 which comprises a first portion 110 containing the hole 112 designed to receive the washer 94 shown in FIG. 6 of the drawing. The elongated arm 100 contains a hole 98 positioned in the end thereof to receive the screw 96 used to fasten the chip breaker 30 to the upper portion 34 of the frame 26. This fastening is accomplished through the hole 88, shown in FIG. 4 of the drawings through the drilled and tapped hole 86 in the gear case 16 shown in FIG. 3 of the drawing. A central portion 114 separates the first portion 110 from the elongated arm 100 and serves to position the chip breaker 30 in the desired position juxtaposed between the two driving wheels 22 and 24.

Referring now to FIG. 15 of the drawing there is shown a view similar to the view shown in FIG. 5 showing a modification of the applicants basic invention utilizing one driving wheel and a pair of idling wheels with the idling wheels being carried by the lower portion of the frame of the applicants invention. In the modification shown in FIG. 15, an upper driving cutter wheel 116 is positioned for cutting between two lower idling cutter wheels 118 and 120. A shaft 122 is carried by the lower portion 36 of the frame structure and a washer 123 is held in place by a screw 124 to keep the wheels 118 and 120 from dropping from the shaft 122 while allowing them to idle. In the embodiment shown in FIG. 15, the chip breaker 126, similar to the chip breaker 30 shown in FIG. 8 would be positioned between the wheels 118 and 120 and would also have a washer, not shown in the drawing, similar to the washer 94 in the FIG. 6 embodiment positioned within the chip breaker. The elongated arm of the chip breaker, not shown in the drawing, would be fixedly attached to the lower portion 36 of the frame 26 of the embodiment of FIG. 15. With this construction, the lower wheels 118 and 120 would be free to rotate as the chip formed in the chip area 128 would cause the rotation of these wheels. A screw 130 positioned in a drilled and tapped hole in the shaft 26 would be used to retain the upper driving wheel 116 on the driving shaft of the motor being used.

A plurality of serrations 132 may be formed on the lower idling wheels in this embodiment as desired by the designer of this modification.

Returning now to FIG. 7 of the drawing there is shown a view similar to the view shown in FIG. 4 and showing the frame of the applicants novel rotary shear attachment fastened to the existing gear case shown in FIG. 3. It can be seen in FIG. 7 how the screw 134 is positioned to hold the washer 136 against the driving wheel 22 to rotatably fasten not only the driving wheel 22 but the driving wheel 24 onto the drive shaft of the motor as has been before mentioned. It can also be clearly seen how the chip breaker 30 is positioned and fixedly attached to the frame 26 by means of the screw 96. A nut 162 is welded onto the lower portion 36 of the frame 26 and is used for attaching the cutter guard 160 to the frame 26. A screw 140 is positioned within the bushing 138 and is used to position the lower idling cutter wheel 28 onto the lower portion 36 of the frame 26. This can be seen more clearly in FIG. 5 of the drawing as well as in FIG. 7. A washer 142 holds the idling cutter wheel 28 on the shaft, not shown in the drawing, and a screw 144 completes the attachment of the idling cutter wheel 28 to the frame 26.

Referring now to FIGS. 10 and 11 of the drawing there will be shown in more detail the frame 26 which is constructed with a plurality of holes 146 and 148 to allow clearance for the shafts 62 and 60 of the driving gears 54 and 52 as shown in FIG. 3. A hole 150 contains the bushing 90 which is pressfit into the hole and serves to space the driving wheel 24 from the upper portion 34 of the frame a distance shown by the numeral 92 in FIG. 5 of the drawing.

The lower portion 36 contains a hole 152 into which is press-fit the bushing 138 used to space the lower idling cutter wheel 28 from the lower portion 36 of the frame 26 as shown in FIG. 5 of the drawing. The separate frame 40 is welded to the upper portion 34 of the frame 26 at the point 154 and is welded to the central portion 38 of the frame at the point 156 forming a part of the diverting means as has been before described.

A dashed area, shown by the numeral 158 in FIG. 10, designates the approximate area where the lower portion 36 of the frame 26 is grasped and fixedly attached to the applicants table to be described more fully hereinafter.

Referring now specifically to FIG. 11 of the drawing there is shown an end view, taken along 11—11 of FIG. 1 showing in further detail the construction of the frame of the rotary shear attachment and also showing in detail the idling cutter wheel guard and how it is positioned on and attached to the frame. For purposes of clarity in FIG. 11, the cutting wheel guard 160 has been shown in section in order to clearly see one means of attachment of the guard to the lower portion 36 of the frame 26. As has been before mentioned, a nut 162 is welded at 164 to the lower portion 36 of the frame 26 and contains the internal threads used to hold the cutter guard 160 onto the frame 26. A bolt 166 is positioned through a washer 168 on the outer side 170 of the cutter guard and is also positioned through a washer 172 on the inside of the cutter guard. A second nut 174 is loosely positioned over the bolt and used as a spacer with the bolt end being positioned into the threaded portion of the welded nut 162 on the lower portion 36 of the frame. In this manner, the cutter guard 160 is able to be tightly positioned against the lower portion of the frame.

Referring now to FIGS. 12 and 13 of the drawing there is shown in FIG. 12 a side view, taken along line 12—12 of FIG. 2 showing in greater detail the idling cutter wheel guard 160. The top surface 176 in combination with the top surface 178 of the central portion 38 form a smooth surface over which a portion of the sheet material being cut in the applicants device passes. A pair of lips 180 and 182 are used to position the cutter guard 160 on the applicants new and novel table to be described hereinafter.

There can be seen in FIGS. 12 and 13 the bolt 166 positioned through the washer 168 on the outide 170 of the cutter guard and also the washer 172 and the bolt 174 positioned on the inside of the cutter guard as shown and described in referring to FIG. 11 of the drawings.

Referring now to FIG. 14 of the drawing there is shown a partial side view, taken along line 14—14 of FIG. 2 showing in greater detail a laminated plastic sheet 186 passing through the applicants rotary shear attachment and showing in greater detail how the diverting means 32 of the applicants invention serves to divert one side of the plastic being cut in a direction away from the plane of the other side of the plastic as the material passes through the rotary shear. As the sheet material 186 passes in the direction shown by the arrow 188, it will be diverted downwardly in the direction shown by the arrow 190 with the cut portion 192 being downwardly diverted by the diverting means in the form of the separate frame 40 in combination with the lower portion or bottom of the central portion 38 of the frame 26. The other side of the sheet material 186 passes on the opposite side of the frame 26 as shown by the numeral 194. As has been mentioned before, the applicants tool may be reversed using the reversing means built into the motor thereby reversing the sheet in the direction shown by the numeral 198.

It should be observed that as a sheet 186 passes through the applicants novel device, in the direction shown by the arrow 188, a chip 102, as shown in FIG. 6 of the drawings, will build up in the rear portion 196 of the stippled area shown in FIG. 6 and when the sheet material 186 is reversed as shown by the arrow 198, the chip will build up in the front portion 200 of the chip area 102 as shown in FIG. 6 also. The reversal of the sheet material 188 would occur whenever the user of the rotary tool is cutting, for example, a T-shaped counter top which would require him to make an entering cut in one direction and then to reverse the rotary tool and to make a second cut in a 90° direction to form the T-shaped counter top. Due to the novel configuration of the applicants device with its chip breaker 30 positioned as shown in the various views of the drawings, the rotary tool will not jam or stall whenever a reversal of the tool is desired due to the forward and rearward action of the chip breaker as configured in the drawings. As has been mentioned before the chip formed by the cutting action of the wheels 22 and 24 and 28 in combination with the chip breaker 30 serves to build up in the area 102 of FIG. 6 and the area 108 of FIG. 5 and drives the lower idling cutter wheel 28 to more accurately direct the sheet material 186 through the shear attachment.

Figures 16, 17:
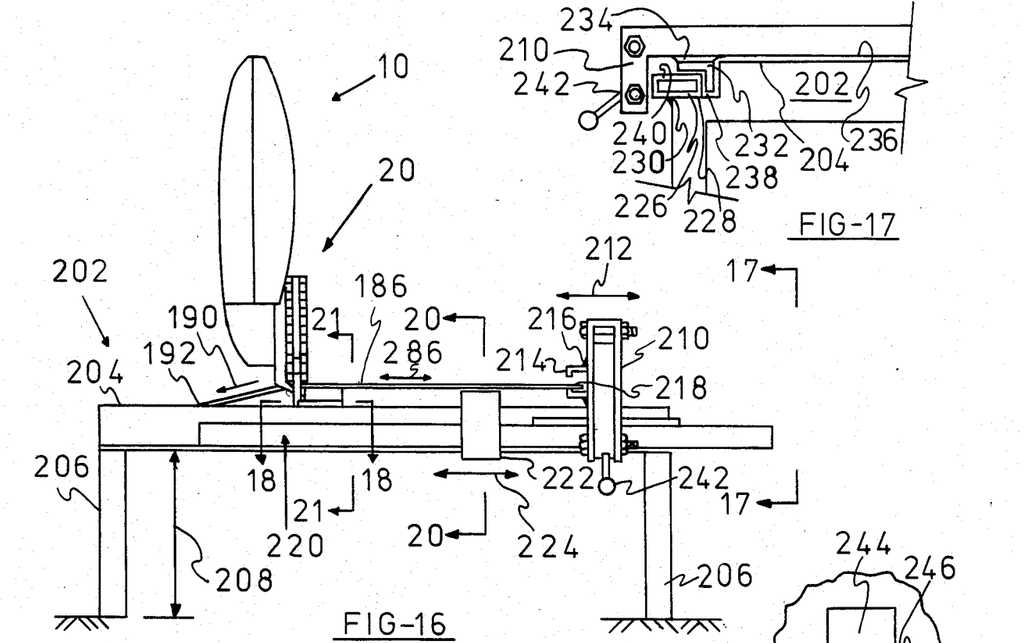
FIG. 16 is an end view of the applicants rotary tool with rotary shear attachment positioned on the new and novel cutting table of the applicants invention.
FIG. 17 is ,a side view, taken along line 17—17 of FIG. 16 showing the movable guide member of the applicants table.

Referring now to FIGS. 16–20 of the drawings, there will be described in detail the applicants new and novel table used with his rotary tool having the shear attachment positioned on the tool. The applicants table is shown generally by the numeral 202 and comprises a horizontal planar surface 204 fixedly attached to a plurality of legs 206. The height of the table, shown by the dimension 208, would be determined by the user of the table with the rotary tool attached according to his particular need. A movable guide member 210 is carried by the table 202 and is capable of moving horizontally in the direction shown by the arrow 212. A horizontally positioned guide channel 214 is welded to the guide member 210 at 216 and serves to carry one end 218 of the sheet 186 of plastic laminate being cut with the applicants rotary tool 10 having the rotary shear attachment 20 attached as hereinbefore described. Attaching means 220 are formed on the table for fixedly attaching the rotary tool 10 to the table 202 in an upright position as shown in FIG. 16 of the drawings. The attaching means 220 will be detailed more fully hereinafter when referring to FIGS. 18 and 19 of the drawings.

A support member 222 is positioned on top of the planar surface 204 of the table 202 and is designed for supporting the laminate plastic sheet 186 as the sheet is cut off by the rotary tool 10. The support member 222 lays on top of the planar surface 204 and is slidable horizontally in the direction shown by the arrow 224. This is seen more clearly in FIG. 20 of the drawing where there is shown the support member 222 which is formed generally in an L-shaped configuration and rests on top of the planar surface 204 of the table 202.

Referring now to FIG. 17 of the drawing there is shown in more detail how the guide member 210 is positioned on the planar surface 204 of the table 202. A box-shaped channel 226 is fixedly attached to the edge 228 of the table 202 and is held in place thereby by means of a weld 230. A metal angle 232 is welded at 234 to the underside 236 of the guide member 210. Thereafter the angle 232 is able to slide horizontally in the space 238 resting on the top surface 240 of the channel 226 carrying the guide member 210 across the top of the table. A guide member brake 242 is positioned within the guide member 210 and serves to lock the guide member to the channel 226 by means known in the art.

Figures 18, 19, 20, 21:
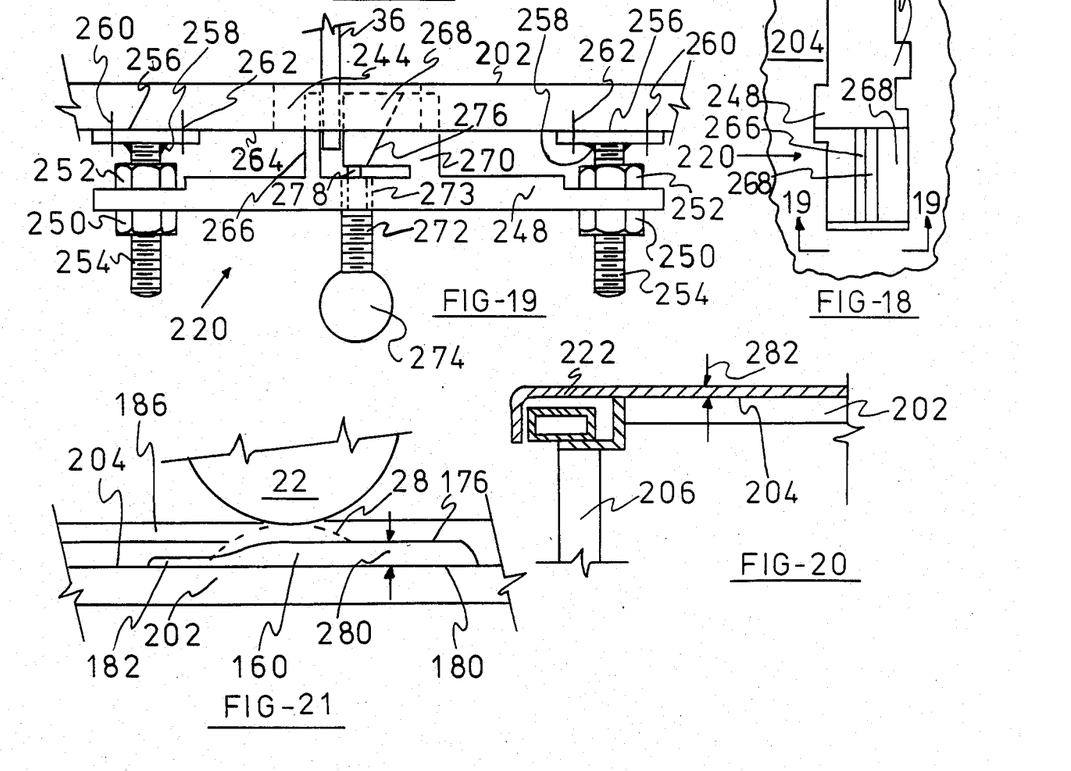
FIG. 18 is a plan view, taken along line 18—18 of FIG. 16 showing the opening formed in the horizontal planar surface of the applicants table and showing in limited detail the attaching means formed on the table for fixedly attaching the rotary tool to the table in an upright position.
FIG. 19 is a cross-sectional view, taken along line 19—19 of FIG. 18 showing in greater detail the attaching means of the applicants novel table.
FIG. 20 is a cross-sectional side view, taken along line 20—20 of FIG. 16 showing in detail the support member positioned on top of the planar surface for supporting the plastic laminate sheet as it is being cut by the rotary tool.
FIG. 21 is a side cross-sectional view, taken along line 21—21 of FIG. 16 showing in an enlarged detail the applicants rotary tool positioned on the table and showing in detail the idling cutter wheel guard positioned partially exposed above the table top.

Referring now to FIGS. 18 and 19 of the drawing there will described in detail the attaching means 220 used for attaching the rotary tool 10 to the table 202. A hole 244 is formed in the planar surface 204 of the table and contains a series of slots 246 and 248 to receive the various protrusions contained on the rotary tool. The attaching means 220 is positioned in a portion of the cutout hole 244 and serves as the means for attaching the rotary tool 10 to the table by tightly grasping the lower portion 36 of the frame 26 in the area shown by the dashed lines 158 in FIG. 10 of the drawing.

FIG. 19 shows in detail how this is accomplished by the use of an elongated frame 248 having a plurality of nuts 250 and 252 positioned on each end of the frame and containing a threaded bolt 254 positioned within the nuts 250 and 252. The bolts 254 contain plates 256 welded thereto at 258 and the plates 256 are attached to the underside of the table 202 by means of screws 260 and 262.

In this manner the frame 248 is fixed to the underside 264 of the table 202 in the vicinity of the hole 244 cut in the table's face. An upright frame 266 is formed on the upper portion of the frame 248 and is used in combination with a movable wedge 268 to tightly grasp the lower portion 36 of the frame 28 of the applicants rotary shear attachment.

The wedge 268 rides on the wedge-shaped frame 270 formed on the upper portion of the elongated frame 248. A screw 272 is positioned within a hole 273 drilled in the frame 248 and contains a ball head 274 used for raising and lowering the wedge 268 by means of the connection 278. As a result the wedge 268 is able to slide against the wedge-shaped frame 270 along the sliding surface 276 thereby serving to tighten or loosen the wedge 268 against the vertical frame 266. In this manner the rotary tool 10 may be quickly inserted into the hole 244 in the table 202 and tightened by means of the attaching means 220 to rigidly hold it in place.

Referring now to FIG. 21 of the drawing there will be shown in detail how the cutter guard 160 will be positioned on the top surface 204 of the table 202 so that its top surface 176 rests on the table top. In this manner the sheet of plastic laminate 186 is able to be passed through the applicants rotary shear attachment 20 as it rests on the surface 176 of the cutter guard 160. The dimension 280 representing a portion of the surface 176 of the cutter guard 160 would be the same as the dimension 282 representing the thickness of the support member 222.

When constructed thusly it can be seen how the support member 222 is able to be horizontally positioned on the table 202 to support the plastic laminate sheet 186 to keep it from bowing downwardly while supported by the table and the guide channel 214 thereby insuring a more accurate cut of the laminate sheet. It can also be seen in FIG. 16 how the diverting means functions to divert one side 192 of the plastic laminate in a direction shown generally by the numeral 190 compared with the horizontal direction 286 of the plastic sheet 186 as the plastic sheet passes through the rotary shear attachment.

When the table 202 is used in this manner with the rotary tool 10 attached for cutting plastic laminate sheets, a precise, clean and non-shattering cut is obtainable along the cutting line. This makes the applicants invention a much more usable tool than any other heretofore previous prior art types of cutting devices mentioned. With the applicants new and novel rotary tool having the rotary shear attachment contained thereon, L-shaped cuts and other shaped cuts are able to be obtained on plastic laminate with the novel tool being able to cut into a line and back out of the same cut without jamming or stalling the cutting tool. In addition a clean, smooth and accurate precise cut is obtainable along the laminate edge without shattering the laminate at the edge thereby resulting in a much improved appearance of the final cut piece of laminate. This will result in less waste due to inaccurate cuts and shattered cut edges reducing the overall cost of the installation.

With the applicants novel rotary shear attachment and the use of the particular arrangement of the wheels in combination with the chip breaker, the applicants tool is able to function precisely as designed utilizing the chip to aid in driving the laminate sheet through the tool. The applicants device as constructed thereby creates a chip of laminate material due to the particular configuration of the wheels of the device and then utilizes that chip as a driving force to aid in driving the sheet through the tool in combination with the serrated edges of the driving wheels. Due to the particular configuration of the chip breaker, accumulated chip cannot build up within the space between the adjacent parallel wheels since the chip breaker fills a major portion of this space. As a result the applicants tool may be able to be used in a forward direction and a reverse direction equally well thereby permitting accurate cuts on the plastic laminate in whatever direction is necessary.

The applicants rotary shear attachment may be positioned on an existing power tool of the type manufactured by Black and Decker under Model No. 7975 as has been before described and may also be attached to a completely new rotary tool having differently designed case and motor mounted within the case and self-contained gearing means. No other power tool on the market is capable of accomplishing all of the objects and advantages of the invention as outlined hereinbefore to the best knowledge of the applicant of this invention.

The applicants invention will be especially useful for cutting high-pressure plastic laminate of the type made and sold under the trademark FORMICA and other names. This type of laminate is very brittle when cut and the applicants invention, with its new and novel features will overcome the usual problems associated in cutting such brittle material.

While changes may be made in the basic configuration of the applicants invention as shown by the modification in FIG. 15 as compared to the FIG. 5 preferred embodiment, it is within the spirit and scope of the invention that other changes may be made and the applicant is not to be limited to the exact configurations shown which have been given by way of illustration only.

Having described my invention, I claim:

1. A rotary shear attachment for cutting plastic and other materials, the attachment being capable of being mounted on an existing motor case and being driven from the existing motor case drive shaft comprising:
   (a) a frame, fixedly attached to the existing motor case, the frame having an upper portion and a lower portion, the lower portion being spaced apart from the upper portion by a central portion;
   (b) at least one driving wheel, fixedly attached to the motor case drive shaft and mounted for rotation as the drive shaft rotates;
   (c) at least one idling cutter wheel, rotatably mounted on the lower portion of the frame and positioned in proximity to the driving wheel to form at least one cutting point in combination with the driving wheel;
   (d) an annular shaped chip breaker having a central hole therein, fixedly attached through the central hole to one of the portions of the frame and positioned adjacent to one of the wheels to break up the chip formed by the shear attachment, whereby the chip breaker functions to prevent unwanted chips from getting into juxtaposition with the driving wheel thereby preventing jamming of any of the wheels; and
   (e) diverting means associated with the frame, for diverting one side of the plastic or other material being cut in a direction away from the plane of the other side of the plastic or other material as the material passes through the rotary shear, the chip breaker being positioned adjacent to the diverting means.

2. The rotary shear attachment as defined in claim 1 wherein there are a pair of driving wheels fixedly attached to the motor drive shaft, the pair of wheels being spaced apart and having positioned therebetween the chip breaker.

3. The rotary shear attachment as defined in claim 2 wherein the pair of driving wheels have serrated edges formed around the circumference thereof.

4. The rotary shear attachment as defined in claim 1 wherein the diverting means comprises in part the central pottion of the frame.

5. The rotary shear attachment as defined in claim 1 further comprising the diverting means comprising in part a separate frame fixedly attached to the upper portion of the frame on one end thereof and to the central portion of the frame on the other end thereof.

6. The rotary shear attachment as defined in claim 1 wherein there are a pair of idling cutter wheels rotatably mounted on the lower portion of the frame, the pair of idling cutter wheels being spaced apart and having positioned therebetween the chip breaker.

7. The rotary shear attachment as defined in claim 6 wherein the driving wheel has serrated edges formed around the circumference thereof.

8. The rotary shear attachment as defined in claim 2 wherein the idling cutter wheel is positioned between the pair of driving wheels and further comprising a pair of cutting points being formed by the positioned wheels, causing a chip to be formed when material passes through the shear attachment, the chip being formed between the pair of driving wheels and serving to rotate the idling cutter wheel thereby serving to drive the plastic or other material, in combination with the pair of driving wheels, through the rotary shear attachment.

9. The rotary shear attachment as defined in claim 6 wherein the driving wheel is positioned between the pair of idling cutter wheels and further comprising a pair of cutting points being formed by the positioned wheels, the cutting points causing a chip to be formed when material passes through the shear attachment, the chip being formed between the pair of idling cutter wheels and serving to rotate the idling cutter wheel thereby serving to drive the Plastic or other material, in combination with the driving wheel, through the rotary shear attachment.

10. An improved rotary tool, having a rotary shear attachment thereon for cutting plastic or other material, comprising, in combination:
   (a) a case;
   (b) a motor mounted inside the case;

(c) means, associated with the motor and positioned within the case, for gearing the motor to a predetermined speed;
(d) driving means, associated with the gearing means and the rotary shear attachment, for driving the rotary shear attachment;
(e) the rotary tool rotary shear attachment further comprising:
  (1) a frame, fixedly attached to the case, the frame having an upper portion and a lower portion, the lower portion being spaced apart from the upper portion by a central portion;
  (2) at least one driving wheel, fixedly attached to the driving means and mounted for rotation as the driving means rotates;
  (3) at least one idling cutter wheel, rotatably mounted on the lower portion of the frame and positioned in proximity to the driving wheel to form at least one cutting point in combination with the driving wheel;
  (4) an annular shaped chip breaker having a central hole therein, fixedly attached through the central hole to one of the portions of the frame and positioned adjacent to one of the wheels to break up the chip formed by the shear attachment, whereby the chip breaker functions to prevent unwanted chips from getting into juxtaposition with the driving sheel thereby preventing jamming of any of the wheels; and
  (5) diverting means associated with the frame, for diverting one side of the plastic or other material being cut in a direction away from the plane of the other side of the plastic or other material as the material passes through the rotary shear, the chip breaker being positioned adjacent to the diverting means.

11. The combination as defined in claim 10 wherein there are a pair of driving wheels fixedly attached to the driving means, the pair of driving wheels being spaced apart and having positioned therebetween the chip breaker.

12. The combination as defined in claim 10 wherein there are a pair of idling cutter wheels rotatably mounted on the lower portion of the frame, the pair of idling cutter wheels being spaced apart and having positioned therebetween the chip breaker.

13. The combination as defined in claim 10 further comprising a rotary tool table, associated with the rotary tool and having formed thereon attaching means, for fixedly attaching the rotary tool to the table in an upright position so that the plastic or other material may be supported by the table as it is being cut by the rotary tool.

14. The combination as defined in claim 13 wherein the attaching means comprises an adjustable wedge slidably mounted on a frame positioned below the table, the wedge being movable upwardly and downwardly a predetermined amount to fixedly attach the rotary tool in a predetermined position.

* * * * *